Nov. 19, 1968   J. A. HOLLY   3,411,176
PATTY MOLD
Filed July 18, 1966
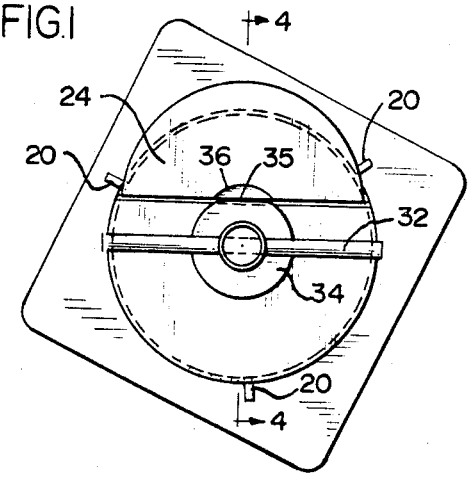
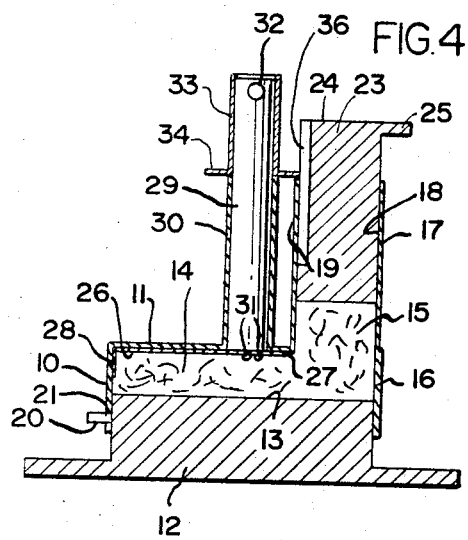
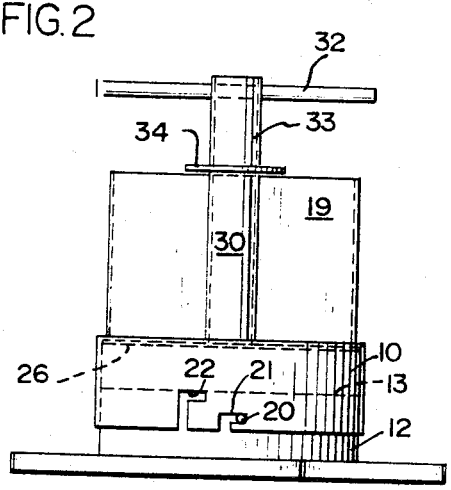
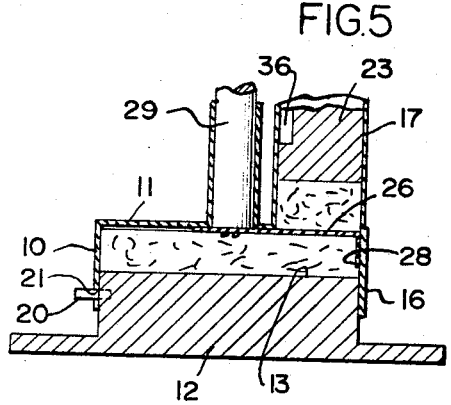
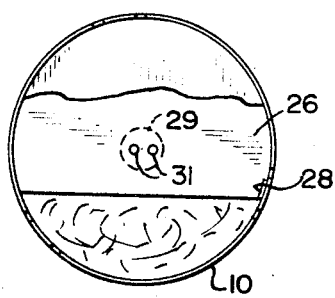
INVENTOR.
JAMES A. HOLLY.
BY Hofgren, Wegner, Allen,
Stellman & McCord.
ATTORNEYS.

United States Patent Office 3,411,176
Patented Nov. 19, 1968

3,411,176
PATTY MOLD
James A. Holly, Olympia Fields, Ill., assignor to Hollymatic Corporation, a corporation of Illinois
Filed July 18, 1966, Ser. No. 566,131
4 Claims. (Cl. 17—32)

ABSTRACT OF THE DISCLOSURE

An apparatus for forming a shaped portion of plastic food material such as a food patty with the apparatus having a passage for the food material leading to a shaping cavity for forming the shaped portion, the cavity having an open end for the ejection of material therefrom, but closable by closure means therefor, pressure means such as a ram for pressure moving the material through the passage into the cavity, and a rotatable dividing means at the shaping cavity movable about its axis of rotation for separating the shaped portion in the cavity from material remaining in the passage, an arcuate edge portion on the dividing means extending more than 180° located within and adjacent an arcuate wall means forming a part of the passage during this separating rotation for aid in giving a smooth surface to the shaped portion.

---

The apparatus of this invention is primarily intended for the production of a relatively small number of patties such as in an ordinary household and having the advantages that the patties are easily, rapidly and uniformly produced with an apparatus of a very small number of parts and that is easily assembled for use and disassembled for cleaning.

One of the features of this invention is to provide an apparatus for forming a shaped portion of plastic food material comprising wall means forming a shaping cavity, passage means to this cavity for directing plastic material forced through the passage means into the cavity, dividing means adjacent the exit of the passage means to the cavity movable to intercepting position to separate the material in the cavity from the passage means and means for removing the resulting shaped portion from the cavity.

Other features and advantages of the invention will be apparent from the following description of one embodiment thereof as shown in the accompanying drawings. Of the drawings:

FIGURE 1 is a plan view of a patty molding apparatus embodying the invention.

FIGURE 2 is a front elevational view thereof.

FIGURE 3 is a bottom view with the base removed and partially broken away for clarity of illustration.

FIGURE 4 is a vertical sectional view taken substantially along line 4—4 of FIGURE 1.

FIGURE 5 is a fragmentary sectional view similar to FIGURE 4 but showing the dividing means turned 180° from the position in FIGURE 4.

In the embodiment shown in the drawings the apparatus comprises wall means 10 of generally cylindrical shape for defining the sides of an edible patty formed in the apparatus. At the top of the wall means 10 there is a flat top wall 11 substantially defining the top of the patty. Releasably attached to the bottom of the side wall 10 is a closure means base wall 12 of relatively heavy construction whose top surface 13 defines the bottom of the patty molding space 14. This space is of course the shaping cavity, here shown as cylindrical for forming the patty of plastic material 15 such as ground meat, fish or other edible food material.

Extending upwardly from the rear 16 of the side wall means 10 is a passage means wall 17 having a curved arcuate configuration similar to the corresponding part of the rear wall 16. The forward portion of the passage 18 is formed by a straight wall 19 extending upwardly from the top wall 11. Thus the passage 18 in this embodiment is formed by the arcuate rear wall 17 and the straight front wall 19 which is essentially a chord of the rear wall 17.

The base 12 which is constructed to be relatively heavy for stability of the apparatus is attachable to the side wall 10 closing the normally open lower end (FIGURES 2, 4 and 5) in a plurality of positions so as to permit making patties of varying thickness. Thus, in the illustrated embodiment the base 12 is provided with a plurality of projecting pins 20 substantially equally spaced around the sides and adapted to engage selected slots 21 and 22 to make a readily releasable bayonet-like attachment. As can be seen in FIGURE 2, the slots 21 and 22 are different distances from the top wall 11 so that the desired thickness of patty can be selected.

In order to force plastic material such as ground meat down the passage 18 and into the patty molding space 14 there is provided a pressure means ram 23 having substantially the same cross sectional shape as that of the passage 19 and provided with a flat top surface 24 for applying downward pressure and a rearwardly extending top lip 25 for exerting removing force on the ram.

Positioned beneath the top wall 11 and movable relative thereto is a dividing means 26 in the form of a flat knife that when in retracted position, as shown in FIGURE 4, covers substantially the entire undersurface of the top wall 11 from the wall 19 of the passage 18 to the side wall 10 of the patty molding space or cavity 14. This dividing knife is preferably of flat sheet metal and is preferably shaped to provide a knife edge 27. The edge 27 is straight, as shown in FIGURE 1, while the arcuate edge of the dividing knife 26 is formed with the downturned right angle flange 28 that is normally positioned against the inner surface of the top of the side wall 10. Thus the knife 26 has an arcuate outer edge defined by an edge flange 28. This arcuate outer edge extends for more than 180° and bears against the cylindrical wall 10 during arcuate movement of the dividing knife 26.

The knife 26 is attached to a shaft 29 at substantially its arcuate axial center which is also the axial center of the cavity 10 (see FIGURE 3) with this shaft being rotatably held in a cylindrical housing 30 extending upwardly from the top wall 11. The knife 26 is attached to the bottom of this shaft 29 at its arcuate center as by a plurality of fastening means 31.

The shaft 29 at its upper end is provided with a transverse handle 32 which is removable from the shaft. The upper end of the shaft beyond the top of the housing 30 in which it is rotatably mounted has releasably attached thereto a sleeve 33 which is held in position on the shaft by the removable handle 32. The bottom of the sleeve 33 at the top of the housing 30 is provided with an outwardly extending disc part 34 that has a generally circular periphery as shown in FIGURE 1 but has a rear portion 35 thereof directly above the knife edge 27 flattened down by a straight edge. This straight rear portion 35 is used as a guide to indicate the position of the cutting edge 27 of the dividing knife 26. Thus when the shaft 29 has been turned to the position shown in FIGURES 1 and 4 the operator knows that the knife 26 is completely out of the passage 19, as shown in FIGURE 4.

In order to provide space for the disc 34 when the ram 23 is pressed down and the shaft 29 is rotated to cause the knife 26 to sever the material in the space 14 from the remainder of the material 15 in the passage 18, the rear portion of the ram 23 is arcuately cut away as indicated at 36.

In using the apparatus for forming a shaped portion such as a patty of plastic food material the base 12 is attached to the side wall 10 by the pins 20 and slots 21 or 22 to provide the desired patty thickness. The plastic material is then forced down the passage 18 by the ram 23 to fill the patty shaped cavity space 14. When this space is filled the knife 26 is rotated about its central axis which coincides with the axis of the shaft 29 by rotating this shaft by means of its handle 32. The cutaway portion 36 of the ram 23 permits this rotation. During this movement of the knife 26 the knife proper and the depending flange 28 thereof severs the material 15 not only from that remaining in the filling passage 18 but also from the side wall 10 as illustrated in FIGURE 5. It is then only necessary to release the side wall 10 from the base 12 by disengaging the pins 20 from the slots 21 or 22 and removing the apparatus from the base 12. When this is done, the shaped patty remains on the top surface 13 of the base from which it is easily removed.

In cleaning the apparatus after this removal from the base 12 and the removal of the shaped patty, the apparatus is further disassembled to aid this cleaning. This is done by withdrawing the ram 23 by means of the lip 25 thereon, removing the handle 32 from its opening in the top of the shaft 29, removing the sleeve 33 from the top of the shaft and forcing the shaft 29 and attached knife 26 downwardly and out of the confines of the side 10 and top 11 wall means.

The knife 26 with its cutting edge 27 and depending flange 28 not only releases the shaped patty from the side and top walls 10 and 11, as described, but also produces a smooth clean cut patty. In rubbing across the surface of the patty the knife removes all laps, air pockets and roughness that might be caused by any improper filling.

Because it wipes the top surface of the patty in a circular motion, it causes fibers and fat pockets of the food material to mix in a circular design that improves the appearance of the patty.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. Apparatus for forming a shaped portion of plastic food material, comprising: wall means defining a passage for holding a quantity of said material and through which said material passes; means defining a shaping cavity for forming said shaped portion positioned at said passage to receive material therefrom, the cavity having a normally closed open end for the ejection of material therefrom; pressure means in said passage for moving said material through said passage into said cavity; a rotatable dividing means at said shaping cavity and substantially wholly contained therein, the dividing means extending only partially across said passage and cavity to permit said material to pass from said passage and cavity to permit said material to pass from said passage and past said dividing means into said cavity but rotatable within the cavity to traverse said cavity substantially completely and thereby separate said shaped portion in the cavity from the material in said passage; and means operable from the exterior of said apparatus for causing the traversing movement.

2. The apparatus of claim 1 wherein said passage wall means comprises arcuate wall means having a longitudinal axis, said movable dividing means is rotatable about an axis and said dividing means has an arcuate edge portion of greater than 180° movable adjacent said arcuate wall means during said separating rotation of the dividing means.

3. The apparatus of claim 2 wherein said axes substantially coincide, there are provided a shaft on said dividing means for rotation thereof, a bearing housing through which said shaft extends, and cooperating guide means on said shaft and housing for guiding said rotation of said dividing means.

4. The apparatus of claim 3 wherein said cooperating guide means comprises an outwardly extending part on said shaft engaging said bearing housing.

References Cited

UNITED STATES PATENTS

| Re. 10,130 | 6/1882 | Coates | 31—44 |
| 2,099,638 | 11/1937 | Wiley | 17—32 |
| 2,101,755 | 12/1937 | Rosenstone et al. | 17—32 |
| 2,187,511 | 1/1940 | Baxter | 17—32 |

LUCIE H. LAUDENSLAGER, *Primary Examiner.*